United States Patent
Murata et al.

(10) Patent No.: US 7,015,399 B2
(45) Date of Patent: Mar. 21, 2006

(54) COMBINATION CALCULATION METHOD AND COMBINATION MEASURING DEVICE

(75) Inventors: Shuji Murata, Ritto (JP); Masayoshi Nakajima, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/516,356

(22) PCT Filed: Apr. 26, 2004

(86) PCT No.: PCT/JP2004/006018

§ 371 (c)(1),
(2), (4) Date: Dec. 1, 2004

(87) PCT Pub. No.: WO2004/109243

PCT Pub. Date: Dec. 16, 2004

(65) Prior Publication Data

US 2005/0173159 A1    Aug. 11, 2005

(30) Foreign Application Priority Data

Jun. 5, 2003 (JP) .............................. 2003-160597

(51) Int. Cl.
*G01G 19/387* (2006.01)

(52) U.S. Cl. .................................. 177/25.18
(58) Field of Classification Search ............. 177/25.18
See application file for complete search history.

(56) References Cited

U.S. PATENT DOCUMENTS

| 4,418,772 A | * | 12/1983 | Fukuda ........................ 177/1 |
| 4,676,326 A | * | 6/1987 | Konishi ........................ 177/1 |
| 4,844,190 A | * | 7/1989 | Mikami et al. ........... 177/25.18 |
| 5,889,235 A | | 3/1999 | Kawanishi et al. ...... 177/25.18 |

FOREIGN PATENT DOCUMENTS

| JP | 01-43889 B | 9/1989 |
| JP | 02-54886 B | 11/1990 |
| JP | 04-118528 A | 4/1992 |
| JP | 8-29242 A | 2/1996 |
| JP | 09-068457 A | 3/1997 |
| JP | 2002-156276 A | 5/2002 |

* cited by examiner

*Primary Examiner*—Randy W. Gibson
(74) *Attorney, Agent, or Firm*—Shinjyu Global IP Counselors, LLP (57) ABSTRACT

The invention provides a combination measuring device allows fast measurement without lowering a measurement accuracy. The combination measuring device accommodates objects in a plurality of containers, performs combination calculation by measuring weights of the objects accommodated in the containers, discharging and collecting the objects selected for an optimum combination from the containers, and thereby obtaining the weighed objects having a target weight. This combination measuring device includes a plurality of measuring units, and a control portion. Each of the measuring units has a measuring portion for measuring the weight of the object accommodated in the container, and a stock portion for stocking the containers accommodating the weighed objects. The control portion performs the combination calculation by using weight values of all the objects stocked by the stock portions of all of the measuring units, while selecting zero or at most one container from each of the measuring units.

7 Claims, 6 Drawing Sheets

COMBINATION CALCULATION METHOD AND COMBINATION MEASURING DEVICE

BACKGROUND OF THE INVENTION

1. Field of the Invention

The present invention relates to a technical field of a combination measuring device and a combination calculation method for measuring a plurality of objects, by which a combination of articles having a predetermined weight or a combination of articles of predetermined numbers can be obtained.

2. Description of the Background Art

In general, a combination measuring device is employed for weighing out an intended weight of objects. For this, the objects accommodated respectively in a plurality of hoppers are weighed, and combination calculation is performed. Then, the objects are selected for an optimum combination, and are discharged from containers. The discharged objects are collected so that the device can weigh out the intended weight of objects. However, the above combination measuring device is generally configured to transfer objects by free fall. Accordingly, the objects become damaged due to collision between the object and the device, or between objects. Further, since the combination measuring device includes the plurality of hoppers, feeders and other complicated members, it is difficult to clean the combination measuring device. Particularly, if viscous objects are handled, the cleaning for removing the viscous objects from the device becomes more troublesome.

For overcoming the above problem, patent references 1 (Japanese Laid-Open Patent Publication No. H8-29242) and patent reference 2 (Japanese Laid-Open Patent Publication No. 2 2002-156276) disclose devices, which use transportable containers for transporting objects together with the containers.

A combination measuring device disclosed in the patent reference 1 includes a plurality of parallel conveyors arranged on a horizontal plane. These conveyors include a conveyor for supplying to the device the containers that have objects accommodated therein, a conveyor for stocking the containers, a conveyor for collecting the containers, a conveyor for discharging the containers and others. The supplied containers are successively stocked on the stock conveyor after being weighed. Then, combination calculation is effected for the objects accommodated in the containers thus stocked. The containers accommodating the objects, which are selected for combination, are pushed out onto the collecting conveyors by a pusher plate. At the collecting conveyor, the selected containers are collected in one position, and then are laid down toward a discharging end via the discharging conveyor so that the objects are collected and discharged.

The combination measuring device of the patent reference 2 has a plurality of transporting trays, and also includes a circulation path for vertically transporting the transporting trays. The measured objects are supplied to the transporting trays and transported along the circulation path. Then, based on a result of the measurement, combination calculation is performed for the objects that are accommodated in the plurality of transporting trays in the circulation path, and the objects selected for the combination are discharged via a plurality of pool hoppers, which are arranged under the circulation path, to an outlet conveyor arranged immediately under the pool hoppers.

DISCLOSURE OF THE INVENTION collects the selected containers in one collecting position. Therefore, such collection takes an excessively long time if the containers remote from the collecting position are selected. Likewise, the measuring device disclosed in the patent reference 2 collects the objects, which are selected and discharged from the transporting trays, in one position, and therefore is not suitable for fast measurement.

Further, the measuring device disclosed in the patent reference 1 stocks the containers in the same order by which the measurement is performed on the stock conveyor. Therefore, an installation space for the measuring device increases as the number of the containers used for the combination increases. On the other hand, if the installation space is small and the number of containers used for the combination is also small, an accuracy of the measuring of the objects lowers.

Accordingly, it is a purpose of the invention to provide a combination measuring device and a combination calculation method, which allow fast measurement without lowering a measurement accuracy.

A first aspect of the present invention provides a combination measuring device for respectively accommodating objects in a plurality of containers, performing combination calculation by measuring weights of the objects accommodated in the containers, discharging from the containers the objects selected as an optimum combination, collecting the selected objects, and thereby obtaining the weighed objects having a target weight. This combination measuring device includes a plurality of measuring units and calculating means. Each of the measuring units has measuring means and stock means. The measuring means measures the weight of the object accommodated in the container. The stock means stocks the plurality of containers accommodating the weighed objects. The calculating means performs the combination calculation by using weight values of all the objects stocked by the stock means of each of the measuring units, selecting at most one container from each of the measuring units, and thereby obtaining the optimum combination.

According to the first aspect of the present invention, the device includes the calculating means for obtaining the optimum combination by selecting, at most, one container from each measuring unit, and it is merely required to discharge the object from only one container in each of the measuring units when collecting the objects in the containers from the respective measuring units. Therefore, the objects in the respective containers in the optimum combination can be collected fast and easily. Thus, the time required for completely discharging the objects from the respective containers in the optimum combination in response to one combination calculation operation can be equal to the time (collecting time) allocated to one container in an operation of successively collecting containers of the optimum combination disclosed in the patent reference 1. Therefore, fast measurement can be performed. Further, each measuring unit can stock the plurality of containers for using them in the combination calculation so that the device can ensure a high measurement accuracy while performing fast measurement.

According to a second aspect of the present invention, the combination measuring device of the first aspect further has such a structure that the stock means stocks the containers in a longitudinal direction.

According to the second aspect of the present invention, since the stock means stocks the plurality of containers in the longitudinal direction, the measurement accuracy can be ensured, and a planar area occupied by the combination measuring device can be small.

According to a third aspect of the present invention, the combination measuring device of the first or second aspect further has a collecting portion. There is only one collecting portion provided for the plurality of measuring units. Each of the measuring units is configured to be able to discharge the object from only one container at a time to the collecting portion.

According to a fourth aspect of the present invention, the combination measuring device of the third aspect further has such a feature that each of the measuring units further has transferring means. The transferring means receives the container from the stock means, and transfers the object accommodated in the container to the collecting portion.

According to a fifth aspect of the present invention, the combination measuring device of the fourth aspect further has such a feature that the transferring means has first drive means for transferring the container, and second drive means for rotating the container.

According to the combination measuring device of the fifth aspect, the second drive means rotates the container to take out the object from the container, and the first drive means moves the container. Thereby, the transferring means can rapidly take out the object from the container.

A combination calculation method according to a sixth aspect of the present invention includes a measuring step, a storing step and a calculating step. In the measuring step, weights of objects in a plurality of containers are measured. In the storing step, a plurality of weight values are stored corresponding to each of the respective containers. In the calculating step, combination calculation is performed based on the plurality of weight values stored in the storing step to obtain an optimum combination. In the calculating step, the optimum combination is obtained while taking account to which group each of the plurality of weight values belongs to, such that at most one weight value is selected from each of the groups.

According to the sixth aspect of the present invention, even when the combination measuring device that performs combination calculation and discharges objects according to the optimum combination has a structure in which objects cannot be discharged from a plurality of containers at a time at each of the groups (e.g., a structure in which the number of discharge portions is minimized to reduce a required space, or an inexpensive, space-saving structure in which only one special mechanism for fast discharging is provided for each group), since only one weight value at most can be selected from each of the groups while obtaining the optimum combination, discharge of objects from the containers of each group can be performed quickly. The number of the groups and/or the number of weight values (containers) belonging to each group may be set to appropriate values so that lowering of the measurement accuracy can be suppressed.

As described above, the combination measuring device using the combination calculation method of the sixth invention can achieve fast measurement while suppressing lowering of the measurement accuracy.

DESCRIPTION OF THE PREFERRED EMBODIMENTS

<Structure of Combination Measuring Device)

Figure 1:
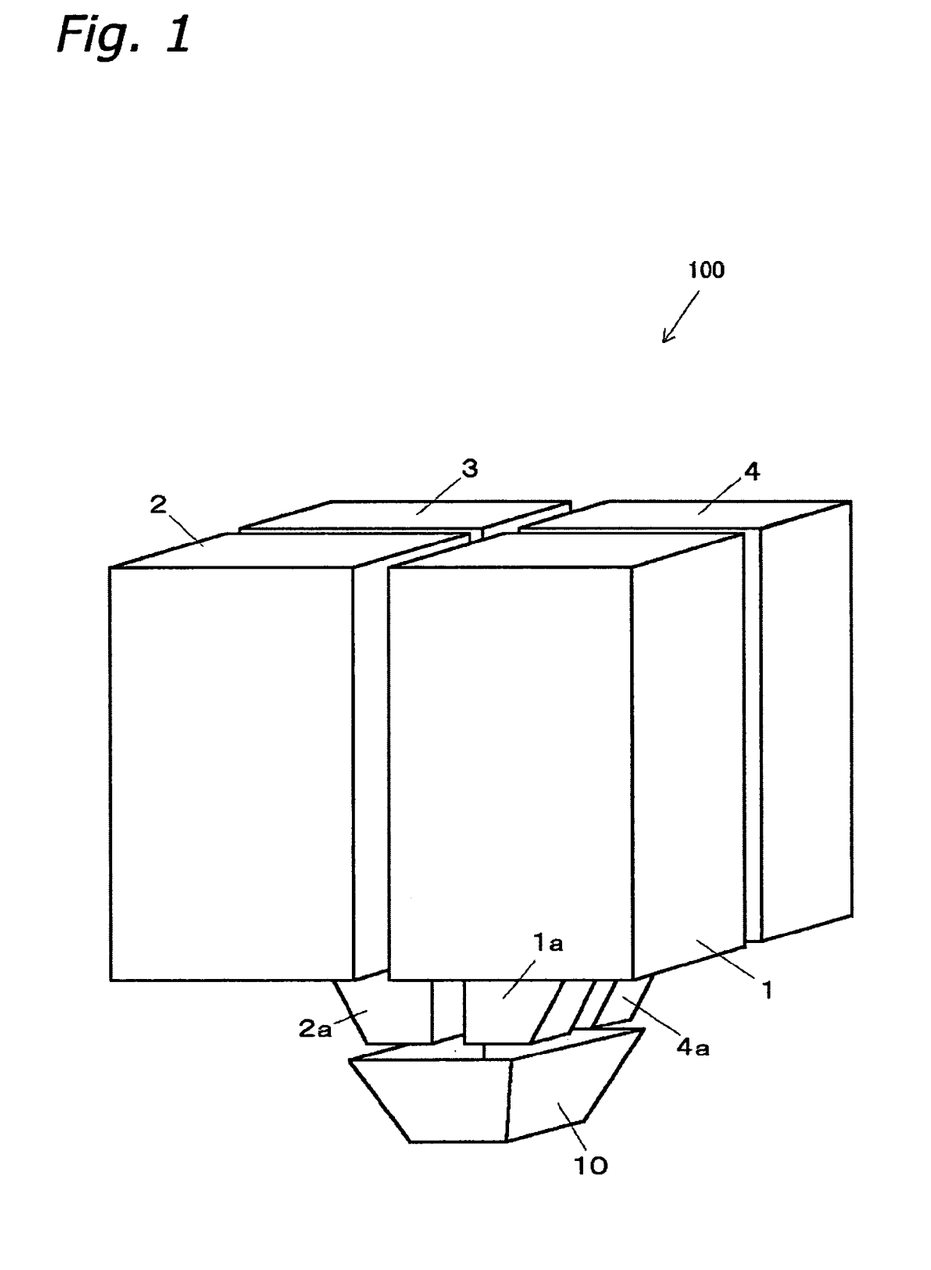
FIG. 1 is a schematic perspective view of a combination measuring device according to an embodiment of the invention.

A combination measuring device 100 according to an embodiment of the invention includes first to fourth measuring units 1, 2, 3 and 4, as shown in FIG. 1. The combination measuring device 100 supplies objects such as foods or industrial products to a plurality of containers each having an opening at its top, measures weights of the objects kept in the containers and performs combination calculation. The combination measuring device 100 discharges the objects from the containers which are selected as an optimum combination, and collects the objects as a combination having an intended total weight.

<Structure and Operation of Measuring Unit)

The measuring units 1, 2, 3 and 4 are provided with, at their lower portions, first to fourth discharge chutes 1a, 2a, 3a and 4a, respectively. One collecting chute 10 is arranged under the first to fourth discharge chutes 1a, 2a, 3a and 4a.

Figure 2:
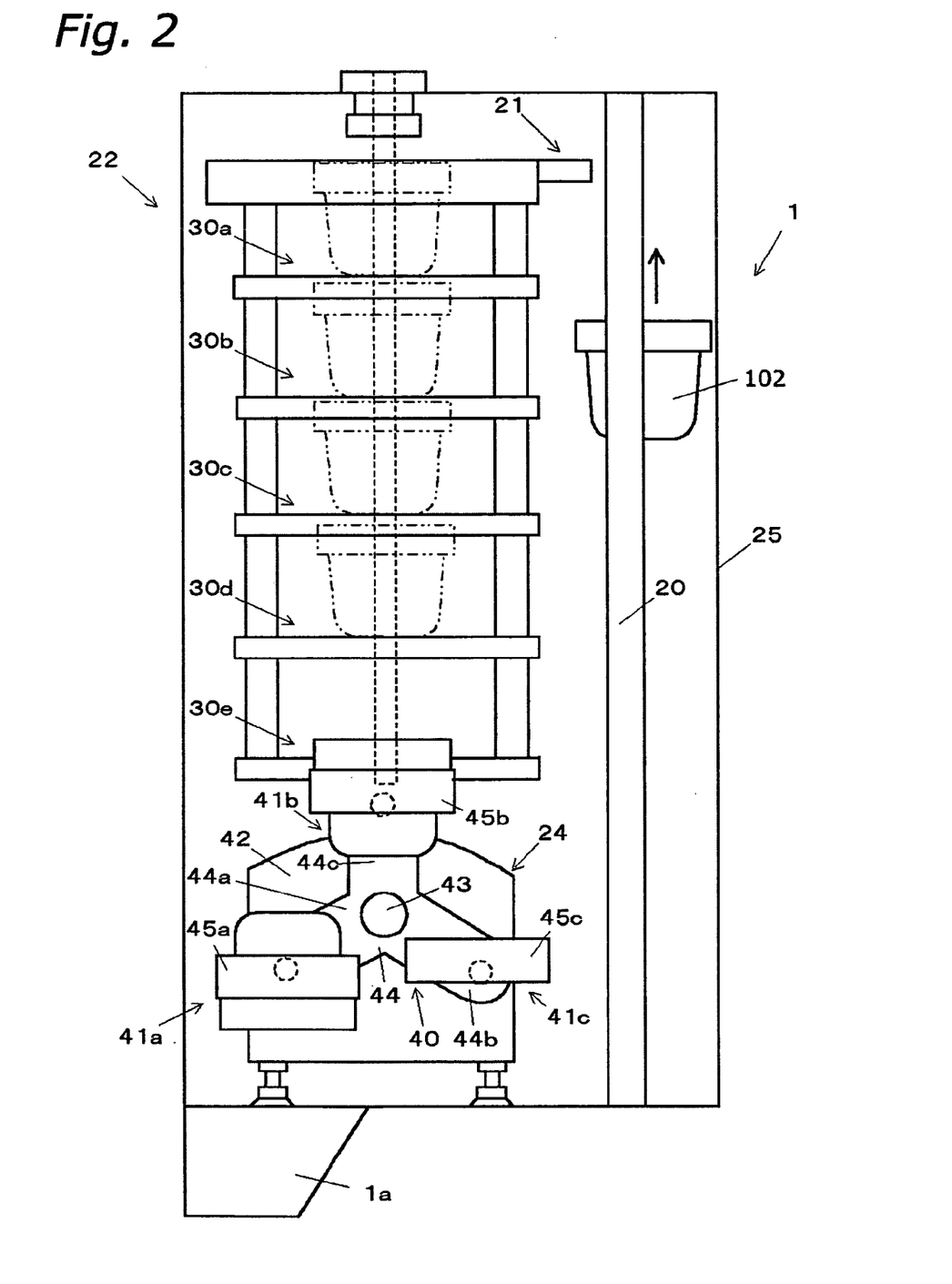
FIG. 2 is an elevation of a first measuring unit.
Figure 3:
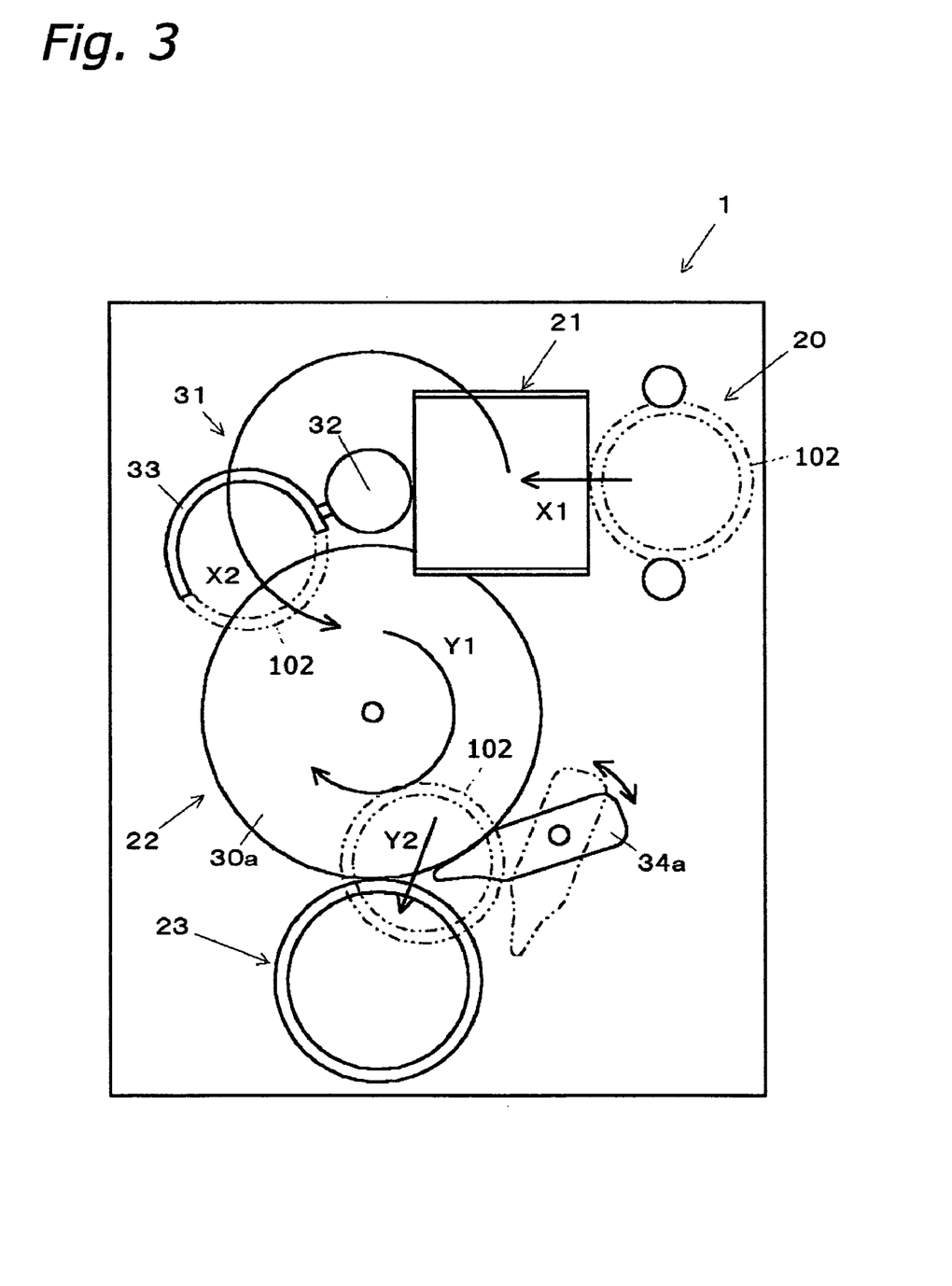
FIG. 3 is a plan showing a top layer of the first measuring unit.

FIGS. 2 and 3 schematically show the first measuring unit 1. FIG. 2 is an elevational view of the first measuring unit 1, and FIG. 3 is a plan view of the first measuring unit 1. The structures of the second to fourth measuring units 2, 3 and 4 are substantially the same as that of the first measuring unit 1, and therefore will not be described.

The first measuring unit 1 is primarily formed of a lift 20, a measuring portion 21, a stock portion 22, a discharge portion 23, a transfer device 24, a frame 25 supporting various portions, and a first discharge chute 1a.

The lift 20 extends from a lower portion of the first measuring unit 1 to an upper portion thereof. The lift 20 sends an empty container 102, from which the object was removed in the last measuring operation, to the measuring portion 21 from the transfer device 24, which will be described later. While the lift 20 is sending the container 102 from the transfer device 24 to the measuring portion 21, a supplying feeder (not shown) automatically or manually feeds the object into the container 102.

The measuring portion 21 is arranged adjacent the lift 20 for measuring a weight of the object in the container 102 while transferring the container 102 in a direction of an arrow X1 in FIG. 3.

The stock portion 22 stocks the containers 102 that accommodate the measured objects therein, and is formed of five layers 30a, 30b, 30c, 30d and 30e aligned in a vertical direction as shown in FIG. 2. Although FIG. 3 shows only the top layer 30a of the stock portion 22, other layers 30b, 30c, 30d and 30e have similar structures. Referring to FIG. 3, the top layer 30a of the stock portion 22 will now be described.

The top layer 30a of the stock portion 22 has an annular path on a horizontal plane, and can circulate the stocked container 102 along this annular path. A transporting portion 31 is arranged between the stock portion 22 and the measuring portion 21. The transporting portion 31 has a support column 32, which extends vertically through the first measuring unit 1, and can rotate in a direction of an arrow X2.

The transporting portion 31 also has a transporting member 33, which is vertically movably arranged on the support column 32. The transporting member 33 supports an edge of the container 102, which passes through the measuring portion 21, and rotates around the support column 32 in the direction of the arrow X2 to transport the container 102 to respective layer 30a, 30b, 30c, 30d or 30e of the stock portion 22.

The container 102 stocked in the stock portion 22 is rotated within the layer 30a, 30b, 30c, 30d or 30e by a drive (not shown) as indicated by an arrow Y1 in FIG. 3. Selector levers 34a, 34b, 34c, 34d and 34e (only lever 34a is shown in FIG. 3), which are respectively provided near the layers 30a, 30b, 30c, 30d and 30e, can operate so that a centrifugal force of the rotating container 102 can move the container 102 in a tangential direction indicated by an arrow Y2 in FIG. 3, and discharges the container 102 to the discharge portion 23.

The discharge portion 23 is a vertical path extending vertically through the first measuring unit 1, and can send the container 102 discharged from the stock portion 22 to the transfer device 24.

The transfer device 24 is arranged under the first measuring unit 1, and transfers to the discharge chute 1a the object, which is discharged from the discharge portion 23, together with the container 102 in which the object is accommodated. The transfer device 24 will be described later in greater detail.

The discharge chute 1a is a box-like member having openings at its top and bottom surfaces, and discharges the object transferred from the transfer device 24 into the collecting chute 10 arranged under the first measuring unit 1. The discharge chutes 1a, 2a, 3a and 4a are arranged on a central side of a relatively lower portion of the combination measuring device 100, and are disposed adjacent to each other.

<Specific Structure and Operation of Transfer Device>

As shown in FIG. 2, the transfer device 24 is formed of a revolving mechanism 40, rotary portions 41a, 41b and 41c, and a casing 42.

The revolving mechanism 40 (an example of the first drive mechanism) is a mechanism for revolving the container 102 accommodating the object in a vertical plane around a revolving shaft 43. The revolving mechanism 40 is primarily formed of a revolving member 44 attached to the revolving shaft 43, and a revolving motor (shown in FIG. 5) M1 arranged within the casing 42 for driving the revolving shaft 43.

As shown in FIG. 2, the rotary portions 41a, 41b and 41c (an example of the second drive mechanism) are mechanisms for rotating the containers 102 accommodating the objects, and are formed in the vicinities of ends of three arm members 44a, 44b and 44c, which constitute the revolving member 44. The rotary portions 41a, 41b and 41c are controlled independently of each other by rotary motors M2, M3 and M4 (see FIG. 5) arranged within the casing 42.

Figure 4:
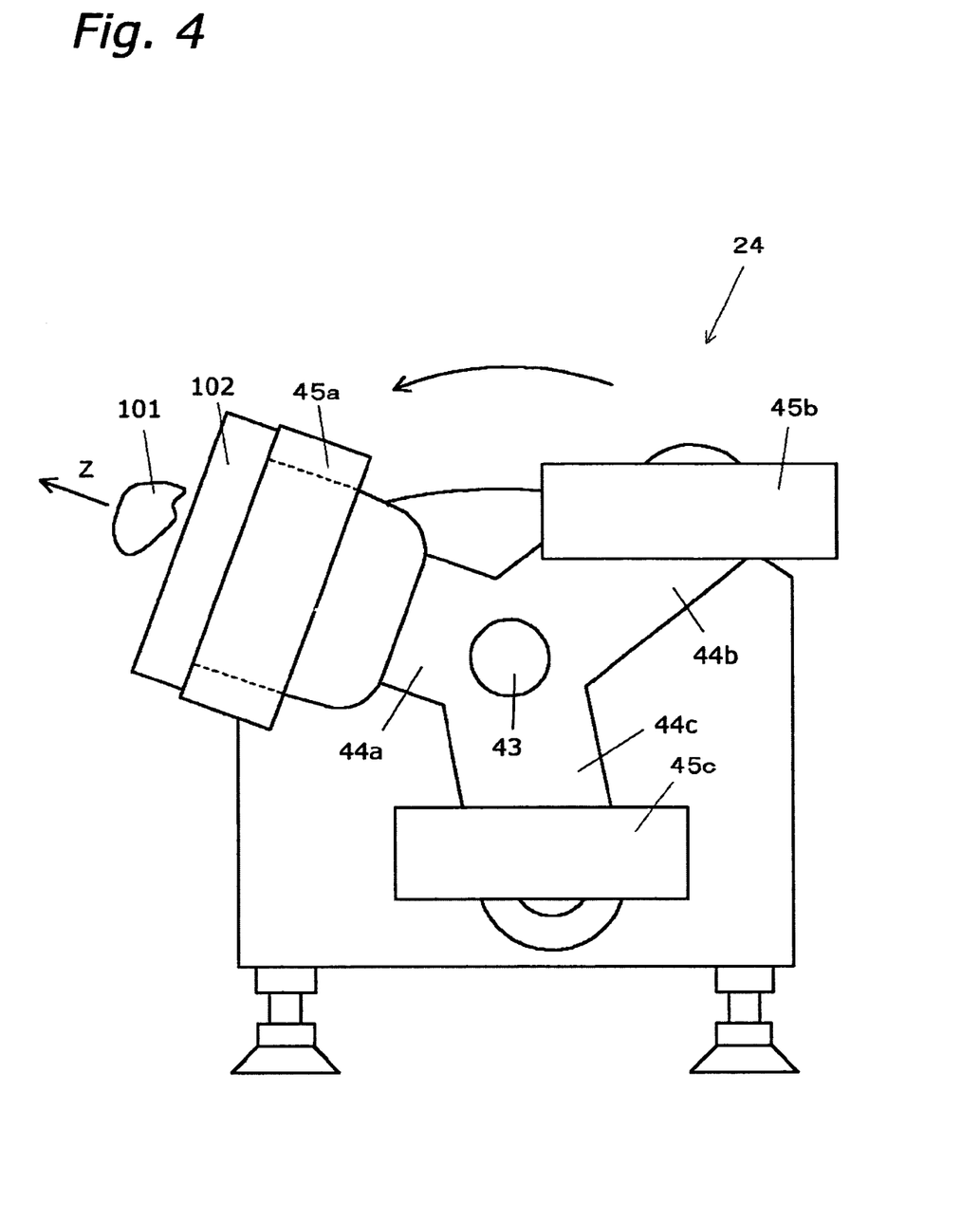
FIG. 4 is an elevation of a transfer device showing a state of discharging of an object from a container.

As shown in FIG. 4, transfer device 24 is provided with holders 45a, 45b and 45c, which receive and hold the containers 102 accommodating the supplied objects. Holders 45a, 45b and 45c are arranged at the vicinities of the ends of the arm members 44a, 44b and 44c, respectively. The rotary portions 41a, 41b and 41c respectively drive and rotate these holders 45a, 45b and 45c with respect to the arm members 44a, 44b and 44c.

The container 102 discharged from the discharge portion 23 is held by one of the holders 45a, 45b and 45c of the transfer device 24. FIG. 4 shows an example, in which the holder 45a holds the container 102. As shown in FIG. 4, when the container 102 held by the holder 45a is revolved by a predetermined angle, this revolution causes a centrifugal force vector represented by an arrow Z in an object 101. In order to match the direction of this vector with the direction in which the object 101 moves toward the opening of the container 102, the container 102 is rotated around an axis (not shown) with respect to the arm member 44a. Thereby, the side or bottom surface of the container 102, which was carrying the object 101, moves to a position previously occupied by the opening of the container 102. Thereby, since a surface (i.e., the bottom or side surface of the container 102) acting against the centrifugal force of the object 101 is no longer present, the centrifugal force discharges the object 101 from the container 102 (see FIG. 4).

After the object 101 is discharged, the empty container 102 further revolves, and is spaced from the holder 45a, 45b or 45c when the container 102 passes under the transfer device 24. Thereby, the empty container 102 is discharged from the transfer device 24. The lift 20 moves the empty container 102 discharged from the transfer device 24 to the measuring portion 21 again for supplying the next object thereto.

The object 101 discharged from the transfer device 24 is sent to the discharge chute 1a, and is discharged to the collecting chute 10. Simultaneously, the collecting chute 10 also receives the objects, which are discharged from the other measuring units 2, 3 and 4 in accordance with the results of combination calculation. These objects are collected, and are discharged from the collecting chute 10 as the objects having the predetermined weight.

<Structure of Control Portion and Basic Control>

Figure 5:
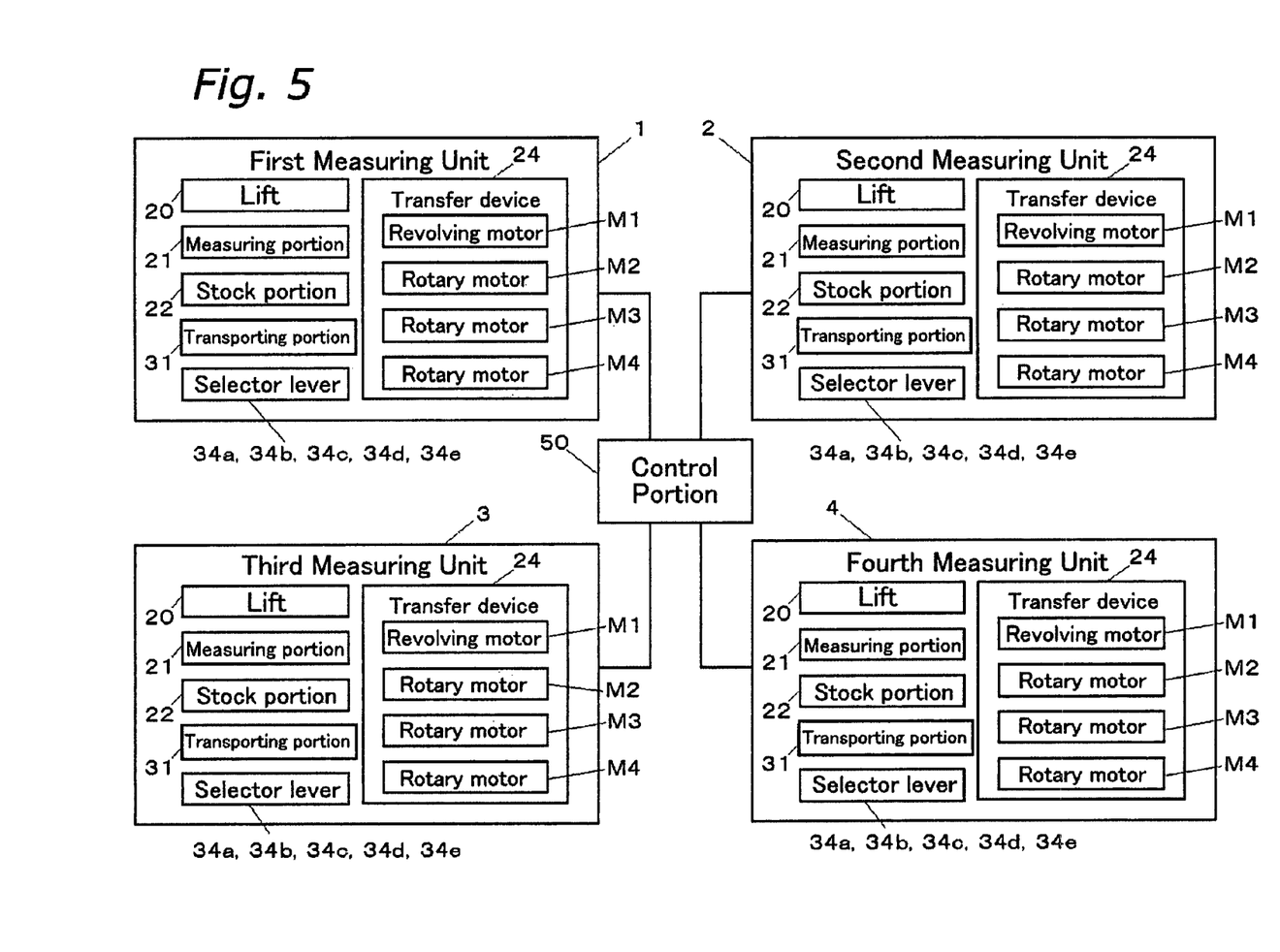
FIG. 5 is a block diagram of the combination measuring device according to the embodiment of the invention.

As shown in FIG. 5, a control portion 50 is configured to control collectively the combination measuring device 100, and is formed of a CPU, a ROM, a RAM, a HDD and others. The control portion 50 is connected to the lift 20, measuring portion 21, stock portion 22, transfer device 24, transporting portion 31 and selector levers 34a, 34b, 34c, 34d and 34e in each of the measuring units 1, 2, 3 and 4.

The control portion 50 performs the combination calculation. According to this combination calculation, the combination of the containers 102 is determined such that a sum of the measured weights of the selected objects in the containers 102 falls within a predetermined range. As a distinctive feature, the control portion 50 selects, at most, one container 102 from each of the measuring units 1, 2, 3 and 4 (an example of the groups to which the containers 102 belong), and discharges the selected containers 102 from the stock portions 22 of the measuring units 1, 2, 3 and 4 to the discharge portions 23. When the stock portion 22 discharges the container 102 to the discharge portion 23, the selector lever 34a, 34b, 34c, 34d or 34e arranged in the layer 30a, 30b, 30c, 30d or 30e, in which the selected container 102 is present, is driven as shown in FIG. 3, which shows by way of example the operation of the selector lever 34a. Then, the control portion 50 controls the transfer device 24 to discharge the objects from the containers 102 to the discharge chutes 1a, 2a, 3a and 4a.

<Specific Example of Control by Control Portion>

Figure 6:
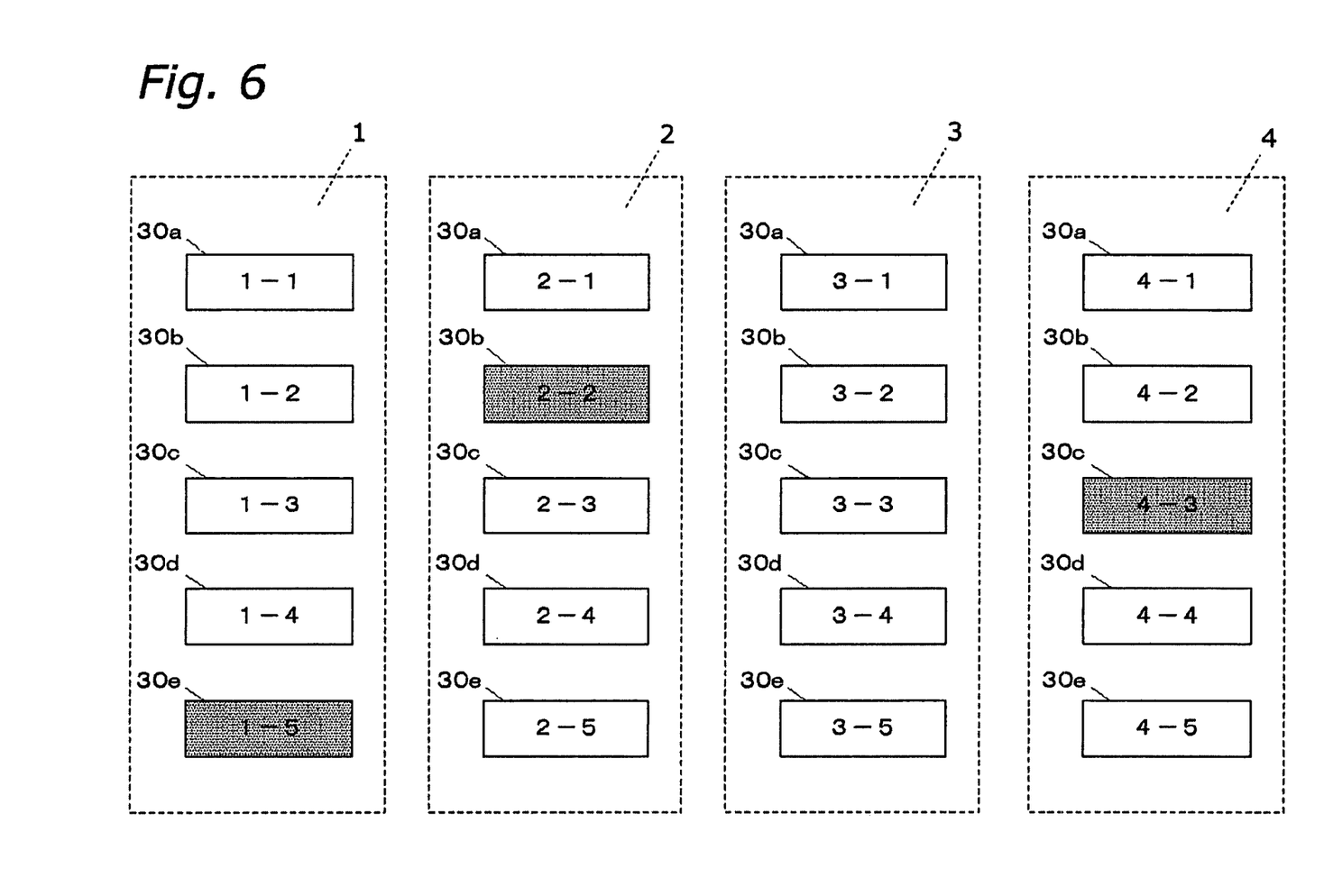
FIG. 6 illustrates an example of combination selection according to the embodiment of the invention.

When the combination measuring device 100 according to the embodiment performs the combination calculation as illustrated in FIG. 6, the control portion 50 performs the control as described below. For example, the first measuring unit 1 operates as follows. First, the object is supplied into the container 102, which is being lifted toward the top of the first measuring unit by the lift 20. The measuring portion 21 measures the weight of the object in the container 102, and sends the measured data to the control portion 50. After the measurement, the transporting member 33 holds and transports the container 102 to the stock portion 22, and the container 102 is temporarily stocked in the layer 30a, 30b, 30c, 30d or 30e. At the same time, the second to fourth measuring units 2, 3 and 4 operate similarly.

Based on the measured data, the control portion 50 performs the combination calculation by using the measured values (weight values) of the objects, which are accommodated in all the containers 102 stocked in the five layers 30a–30e of each of the measuring units 1, 2, 3 and 4. Thus, the control portion 50 selects the optimum combination of the containers 102 from the containers 102 stocked in the measuring units 1, 2, 3 and 4 such that the total weight of the containers 102 in the optimum combination matches with the target weight, or falls within an allowed range from the target weight. In this case, the control portion 50 selects the containers 102 for the optimum combination under a condition that only one container 102 at most can be selected from each of the measuring units 1, 2, 3 and 4. Thus, the control portion 50 performs the combination calculation to select only one or zero container 102 from each of the measuring units 1, 2, 3 and 4.

In the example illustrated in FIG. 6, the three containers 102 are selected in total during one measuring operation. The container 102 in the fifth layer 30e is selected from the first measuring unit 1, the container 102 in the second layer 30b is selected from the second measuring unit 2, no container is selected from the third measuring unit 3, and the container 102 in the third layer 30c is selected from the fourth measuring unit 4.

When the selector lever 34e in the first measuring unit 1, the selector lever 34b in the second measuring unit 2 and the selector lever 34c in the fourth measuring unit 4 are driven as represented by alternate long and two short dashes line in FIG. 3, the stock portions 22 discharge the containers 102 stocked in the fifth layer 30e in the first measuring unit 1, the second layer 30b in the second measuring unit 2 and the third layer 30c in the fourth measuring unit 4 to the discharge portions 23, respectively. In this operation, since the third measuring unit 3 does not have the selected container 102 none of the selector levers 34a, 34b, 34c, 34d and 34e in the third measuring unit 3 is driven, the selector levers 34a, 34b, 34c, 34d and 34e are all kept in the position shown by solid line in FIG. 3.

Here, the operation of selecting the three containers 102 has been described. Naturally, the number (one to four in this case) of the containers 102 to be selected is not basically restricted. The number (one to four in this case) of the containers 102 to be selected in each measuring operation may be freely changed at each measuring operation.

The selected containers 102 are sent from the discharge portion 23 to the transfer device 24. In this operation, the rotary motor M1 rotates the revolving mechanism 40 so that one of holders 45a, 45b and 46c holds the container 102. Before the revolving member 44 revolves a predetermined angle, the drive of the motors M2, M3 and M4 is controlled to prevent such a situation where the centrifugal force caused by the revolution of the revolving member 44 discharges the object from the container 102. When the revolving member 44 revolves the predetermined angle or more, the drive of the rotary motors M2, M3 or M4 is controlled to rotate the container 102 itself so that the centrifugal force discharges the object from the container 102 into the discharge chute 1a, 2a or 3a.

<Feature of Combination Measuring Device>

As described above, the combination measuring device 100 according to the embodiment includes the plurality of measuring units 1, 2, 3 and 4, and thereby is configured to allow random transportation and collection of the objects 101 accommodated in the containers 102. Thereby, the objects 101 held by the plurality of containers 102 can be simultaneously transported and discharged so that it is possible to eliminate the waiting time required in a conventional device that performs successive collection and discharge (i.e., the waiting time required for collecting the objects 101 held by the containers 102 in one position). Therefore, the device can perform fast measurement.

Since the maximum number of the container 102 that can be selected from each of the measuring units 1, 2, 3 and 4 in one combination calculating operation is restricted to one, the time required for receiving the results of the one combination calculating operation and discharging the objects of the predetermined weight can be reduced to the time (collecting time) it would take to collect from only one container 102 in an operation of a conventional device in which objects are successively collected from the selected containers 102. This enables even faster measurement.

Further, each of the measuring units 1, 2, 3 and 4 can stock the plurality of containers 102 to be used for the combination calculation. Therefore, it is possible to ensure a sufficient number of containers 102 for using in the combination calculation so that both the high measurement accuracy and the fast measurement can be achieved.

Further, the five layers 30a, 30b, 30c, 30d and 30e included in each of the measuring units 1, 2, 3 and 4 are aligned in the vertical direction. Therefore, the combination measuring device 100 can have a compact structure.

Although the combination measuring device 100 of the embodiment already described has four measuring units, it may include five or more measuring units. By increasing the number of the measuring units, more containers 102 can be used for the combination calculation, which can further improve the measurement accuracy.

According to the invention, the operation of collecting the objects in the containers from the measuring units can be performed by discharging the object from only one container in each of the measuring units. This allows fast collection of the objects from the containers in the optimum combination, and thus can achieve fast measurement. Since the plurality of containers can be stocked in each measuring unit for use in the combination calculation, a sufficient measurement accuracy can be ensured. As described above, the invention can be effectively applied to the technical field of the combination measuring device and the combination calculation method for obtaining an aggregation having a predetermined weight or formed of predetermined numbers, and particularly to the field for allowing fast calculating without lowering the measurement accuracy.

What is claimed is:

1. A combination measuring device for obtaining a combination of objects measured to have a weight that is within a predetermined target weight range, said combination measuring device comprising:
   a plurality of measuring units each having
      a plurality of containers, the objects being accommodated in each of said plurality of containers,
      a measuring portion for obtaining weight value of each of the objects accommodated in said containers, and
      a stock portion in which said plurality of containers accommodating the weighed objects are stocked; and a control portion that performs the combination calculation by using the weight values of all the objects stocked in said stock portions of all of said measuring units, such that an optimum combination of containers is selected with zero or one container at most being selected from each of said measuring units.

2. The combination measuring device according to claim 1, wherein
said stock portion stocks the containers in a longitudinal direction.

3. The combination measuring device according to claim 1, further comprising:
one collecting portion provided for said plurality of measuring units, wherein
each of said measuring units is configured to be able to discharge the object from only one container to said collecting portion at a time.

4. The combination measuring device according to claim 3, wherein
each of said measuring units further has a transferring portion that receives the container from said stock portion, and transfers the object accommodated in the container to said collecting portion.

5. The combination measuring device according to claim 4, wherein
said transferring portion has a first drive mechanism for transferring the container, and a second drive mechanism for rotating the container.

6. A combination calculation method by which an optimum combination of objects that is measured to have a weight within a predetermined target weight range is determined, the method comprising:
a measuring step of measuring weights of objects accommodated in a plurality of containers, each of the plurality of containers belonging to one of a plurality of groups;
a storing step of storing the plurality of weight values for each of the respective containers together with the group to which the container belongs; and
a calculating step of performing combination calculation to obtain the optimum combination of the objects based on the plurality of weight values stored in said storing step, wherein
in said calculating step, the optimum combination is obtained while taking into account to which group each of the plurality of weight values belongs to, such that zero or one weight value at most is selected from each of the groups.

7. The combination measuring device according to claim 5, wherein
said first drive mechanism includes an arm portion at which the container is held, and a first motor that rotates the arm, and
said second drive mechanism includes a second motor that rotates the container relative to the arm portion.

* * * * *